United States Patent [19]

Bernier

[11] Patent Number: 5,029,799
[45] Date of Patent: Jul. 9, 1991

[54] DOWNTILT SUPPORT BRACKET FOR MOUNTING AN ANTENNA ON A METALLIC TOWER

[75] Inventor: Marc Bernier, St. Jean, Canada
[73] Assignee: Roy Telecommunications Lt'ee, Quebec, Canada
[21] Appl. No.: 487,826
[22] Filed: Mar. 5, 1990
[51] Int. Cl.⁵ .............................................. F16M 13/00
[52] U.S. Cl. ..................................... 248/514; 248/533
[58] Field of Search ............... 248/514, 515, 528, 534, 248/530, 533

[56] References Cited

U.S. PATENT DOCUMENTS

| | | | |
|---|---|---|---|
| 2,605,778 | 8/1952 | Clapper | 248/514 |
| 2,618,285 | 11/1952 | Heisig | 248/514 |
| 2,706,608 | 4/1955 | Joseph | 248/514 |
| 2,721,631 | 10/1955 | Honold | 248/514 |
| 2,733,030 | 1/1956 | Hawthorne | 248/514 |
| 3,191,898 | 6/1965 | McCullough | 248/514 |
| 4,650,146 | 3/1987 | Duke | 248/533 |

Primary Examiner—Robert L. Wolfe
Attorney, Agent, or Firm—Longacre & White

[57] ABSTRACT

A mechanical bracket for mounting a telecommunication antenna on a metallic tower comprises a pipe section to secure the bracket to the tower. The angular position of the pipe section about its longitudinal axis is selected to appropriately orient the bracket. A transversal pivot bridges a pair of spaced apart parallel plates of the bracket. The antenna comprises a pole member with a free end pivotally mounted on the pivot between the two plates. A bolt and nut assembly traverses the pole member and two arcuate slots respectively made in the parallel plates. In operation, the pole member is rotated about the pivot with the bolt sliding in the two arcuate slots, and the bolt and nut assembly is tightened when a desired position for the pole member, and therefore for the antenna, is reached to thereby lock the pole member and the antenna in this position.

3 Claims, 1 Drawing Sheet

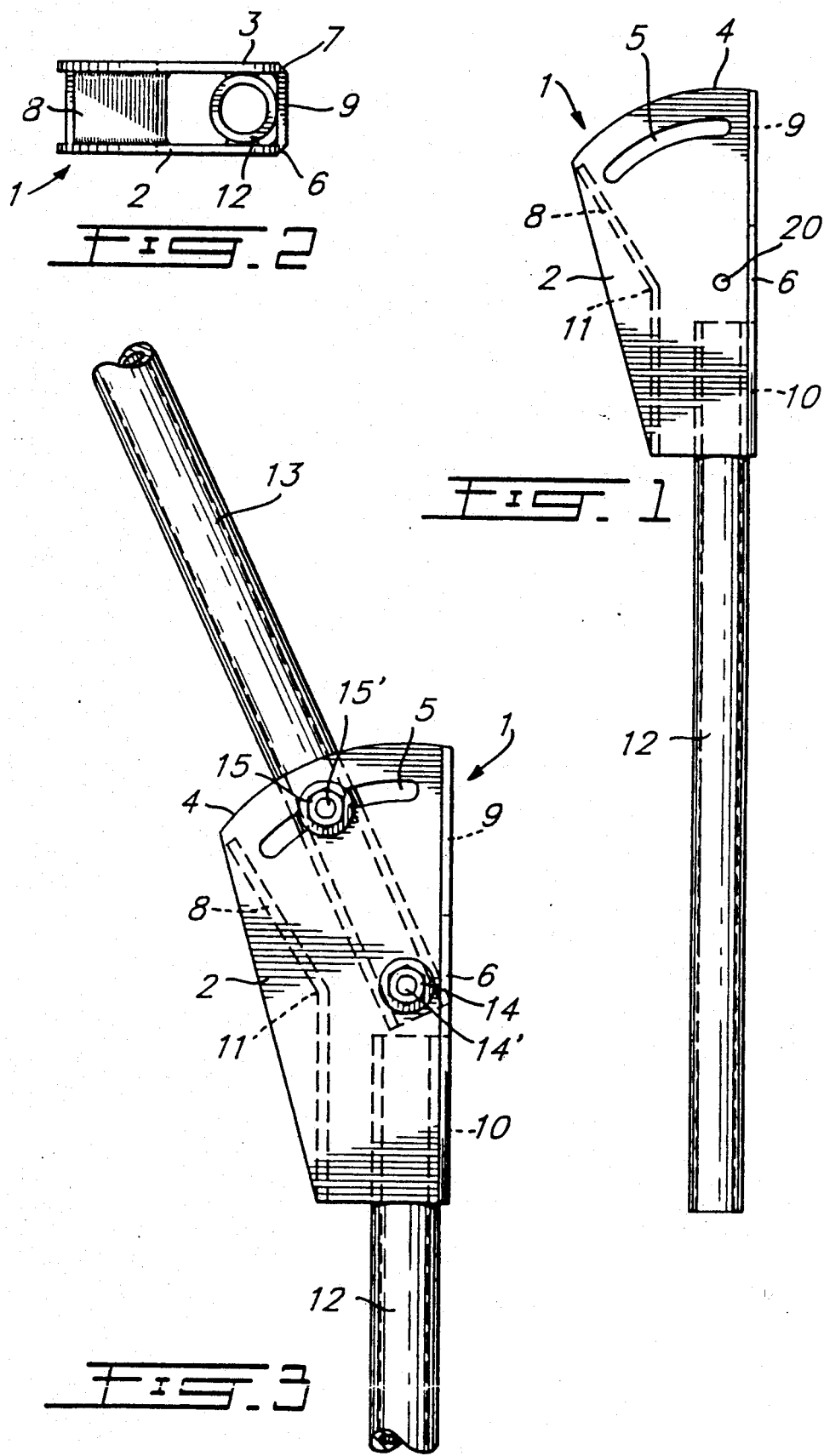

DOWNTILT SUPPORT BRACKET FOR MOUNTING AN ANTENNA ON A METALLIC TOWER

BACKGROUND OF THE INVENTION

1. Field of the Invention

The present invention relates to a mechanical bracket of simple design for mounting on the top of a metallic tower an antenna for, in particular but not exclusively, cellular telephony.

2. Brief Description of the Prior Art

A conventional device used to mount an antenna for cellular telephony on the end of a metallic tower comprises a plurality of articulated arms. The mechanical articulations between the arms enable correct orientation of the antenna but make the resulting device complex and accordingly expensive. Another drawback of such a conventional device is that it is heavy. The charge on the tower due to each antenna is therefore increased whereby fewer antennae can be mounted on the top of the tower.

OBJECT OF THE INVENTION

An object of the present invention is therefore to eliminate the above discussed drawbacks of the prior art by providing a light-weight mechanical bracket of simple design capable of fixing a telecommunication antenna to a tower while enabling positional adjustment thereof.

SUMMARY OF THE INVENTION

More particularly, the subject invention is concerned with a mechanical bracket for mounting a telecommunication antenna on an antenna support structure, comprising:

means for fixedly securing the mechanical bracket to the support structure; and means for fastening the antenna to the mechanical bracket, these antenna fastening means comprising means for moving the antenna with respect to the bracket whereby spatial positioning of the antenna is enabled.

In accordance with an advantageous feature of the invention, the bracket securing means comprises an elongated, cylindrical tubular member with a longitudinal axis, which tubular member having an angular position about its longitudinal axis selected to appropriately orient the bracket.

In accordance with other advantageous features of the invention, (a) the bracket comprises a pair of spaced apart parallel plates each comprising an arcuate slot therein, (b) a pivot is disposed between the two parallel plates, it is perpendicular to these plates, and is spaced apart from the arcuate slots, (c) the antenna comprises a pole member with a free end pivotally mounted on the pivot between the parallel plates, and (d) a bolt and nut assembly traverses the slots in the plates and the pole member. Accordingly, in operation, the pole member can be pivoted about the pivot with the bolt of the bolt and nut assembly sliding in the two arcuate slots, and the latter assembly can be tightened when a desired position for the pole member, and therefore for the antenna, is reached to thereby lock the pole member and the antenna in this desired position.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a side, elevation view of a bracket in accordance with the present invention;

FIG. 2 is a top view of the bracket of FIG. 1; and

FIG. 3 is an enlarged, partial side elevation view of the bracket of FIG. 1 to which is mounted the pole of a telecommunication antenna.

DETAILED DESCRIPTION OF THE PREFERRED EMBODIMENTS

As illustrated in FIGS. 1 and 2 of the appended drawings, the preferred embodiment of the bracket 1 of the invention comprises a pair of lateral steel plates 2 and 3 which are symmetrical with respect to a central plane parallel to these plates. The shape of the plates 2 and 3 is shown in FIG. 1. In particular, each plate 2 and 3 has a semicircular and inclined upper edge 4, as well as a semicircular upper slot 5 parallel to the edge 4. The arcs of circle defined by the edge 4 and slot 5 have a common center on which is centered a hole 20. The vertical rear edges 6 and 7 of the plates 2 and 3 are beveled.

The lateral plates 2 and 3 are interconnected through a set of three steel plates, namely a front plate 8 and two rear plates 9 and 10, welded to the lateral plates 2 and 3. As shown in FIG. 1, the front plate 8 defines an obtuse angle 11 and has a lower portion which is vertical. The rear plates 9 and 10 are planar and rectangular, they interconnect the beveled edges 6 and 7, are lying in the same vertical plane one above the other, and are spaced apart from each other by a given distance.

The bracket further comprises a vertical pipe section 12 of which the upper end is inserted between the lateral plates 2 and 3 and is welded to the inner surfaces of these two plates. As illustrated in FIG. 2, the outer, cylindrical surface of the pipe section 12 contacts the inner surfaces of the plates 2, 3 and 10. The top edges of the pipe section 12 and of the rear plate 10 are at the same level, and the longitudinal axis of the latter pipe section is parallel to the beveled edges 6 and 7.

Referring now to FIG. 3 of the appended drawings, the antenna comprises a pole 13 of which the lower end is pivotally mounted to the bracket 1. The pole 13 is typically a cylindrical tube made of aluminum. More specifically, the lower end of the pole 13 is introduced between the lateral plates 2 and 3, and a transversal bolt and nut assembly 14 traverses holes in the pole and the holes 20 in the latter plates. The pole 13 can therefore be rotated about the pivot formed by the bolt 14' of assembly 14, the spacing between the plates 9 and 10 providing clearance for that purpose. The bolt and nut assembly 14 is therefore positioned on the center of the arcs of circle defined by the edges 4 and the slots 5 of the plates 2 and 3.

Another transversal bolt and nut assembly 15 traverses holes in the pole 13 and the slots 5 in the two plates 2 and 3. Accordingly, the bolt 15' of assembly 15 slides into the slots 5 when the pole 13 is pivoted about the bolt 14'. In order to adjust the position of the antenna, one has only to pivot the pole 13 about the bolt 14', and as the antenna reaches the desired position the bolt and nut assembly 15 is tightened to lock the pole 13 and therefore the antenna in this position.

The bracket 1 can be installed on the end of a metallic tower (not shown). For that purpose, the pipe section 12 is fixed to the tower through suitable fasteners (not shown). It is positioned vertical using a level with its angular position about its longitudinal axis selected to appropriately orient the bracket 1. The last step in adjusting the position of the antenna is to rotate the pole 13 about the bolt 14' and then to tighten the bolt and nut assembly 15, as explained in the foregoing description. The bolt and nut assembly 14 can then also be tightened to increase the rigidity of the fixation.

Of course, the pipe section 12 can be fixed vertical on the tower with the plates 2, 3, 9 and 10 at the lower or the upper end thereof.

The bracket 1 in accordance with the invention can be used to install on the top of a metallic tower any type of telecommunication antenna, in particular but not exclusively an antenna for cellular telephony.

Although the present invention has been described hereinabove with reference to a preferred embodiment thereof, such an embodiment can be modified at will, within the scope of the appended claims, without departing from the spirit and nature of the invention. In particular, the pipe section 12 can be replaced by any other type of fastener suitable to mount the bracket 1 on the metallic tower.

What is claimed is:

1. A mechanical bracket for mounting a telecommunication antenna on an antenna support structure while enabling spatial positioning of the said antenna, comprising:

means for fixedly securing the mechanical bracket to the antenna support structure; and means for fastening the said antenna to the mechanical bracket, said antenna fastening means comprising (a) a pivot about which said antenna is rotatable, and (b) means for locking in position the said rotatable antenna; wherein:

the said bracket comprises a pair of spaced apart parallel plates each comprising an arcuate slot therein, and a pair of spaced apart plate means for rigidly interconnecting said parallel plates;

the said pivot is mounted between the two parallel plates, it is perpendicular to the said parallel plates, and is spaced apart from the arcuate slots;

the said antenna comprises a pole member with a free end pivotally mounted on said pivot between the two parallel plates and between the two plate means; and the said locking means includes the two arcuate slots in the parallel plates and a bolt and nut assembly traversing the said slots and pole member;

whereby, in operation, the pole member can be pivoted about the said pivot with the bolt of the said bolt and nut assembly sliding in the two arcuate slots, and the said bolt and nut assembly can be tightened when a desired position for the pole member, and therefore for the said antenna, is reached to thereby lock the pole member and the antenna in said desired position.

2. The mechanical bracket of claim 1, wherein the said bracket securing means comprises an elongated member with a longitudinal axis, the said elongated member having an angular position about its longitudinal axis that can be selected to appropriately orient the said bracket.

3. The mechanical bracket of claim 1, in which the said elongated member is tubular and cylindrical.

* * * * *